July 25, 1933.  F. X. GOVERS  1,920,125
PROCESS FOR THE RECOVERY AND PURIFICATION
OF LUBRICATING OILS FROM MINERAL OILS
Filed April 2, 1931    4 Sheets-Sheet 1

FRANCIS X. GOVERS
INVENTOR

BY R. J. Dearborn
HIS ATTORNEY

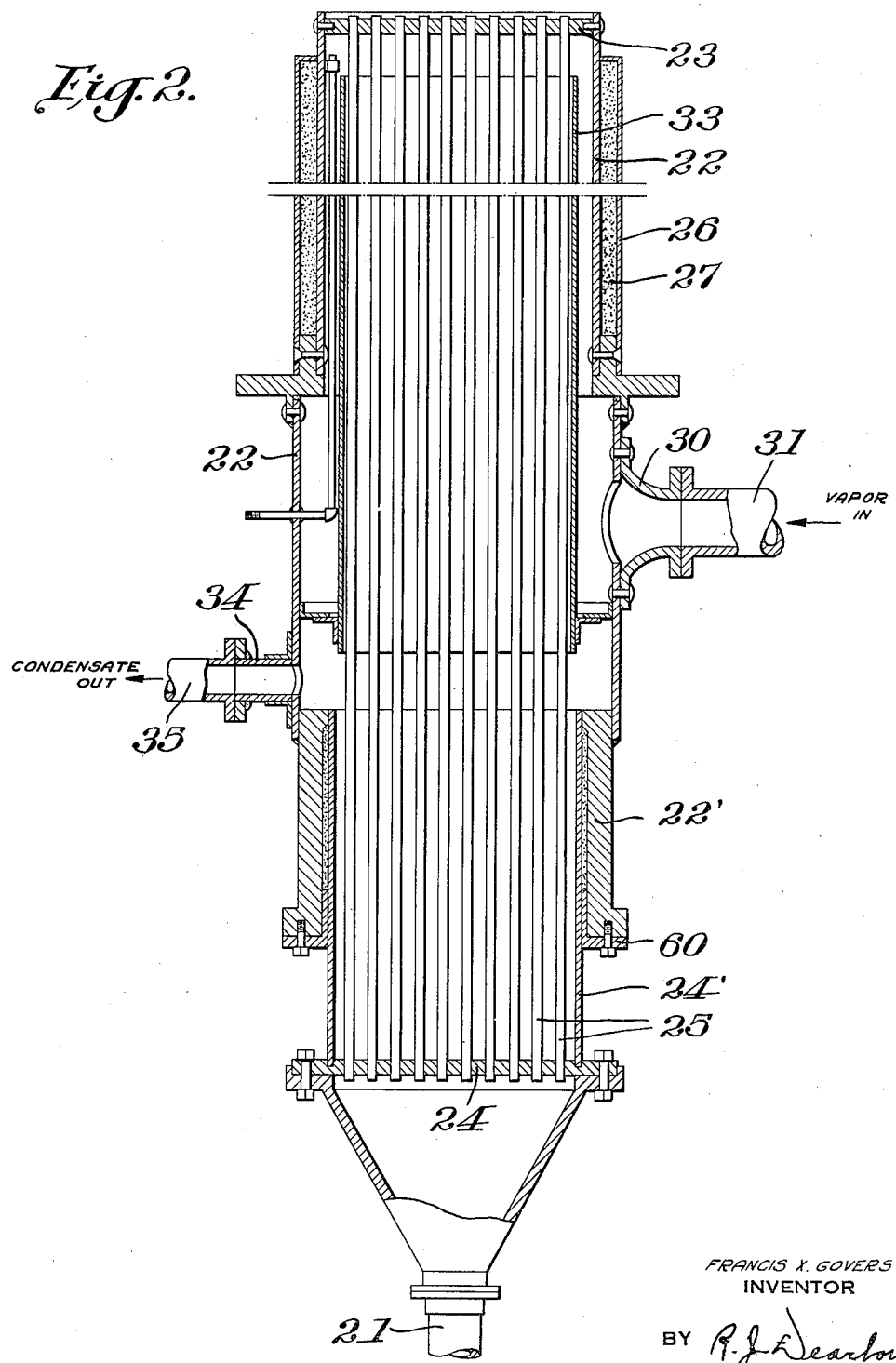

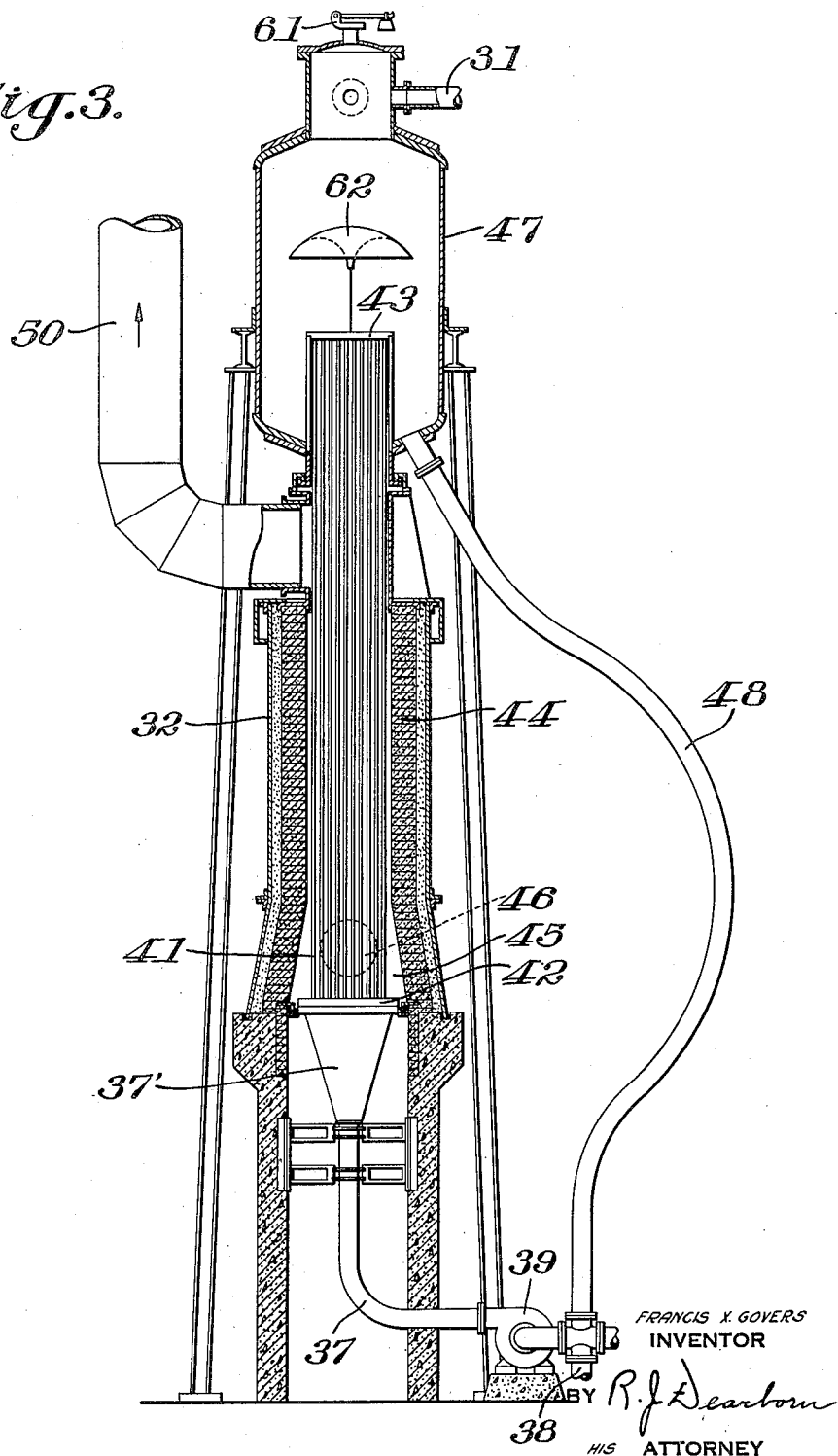

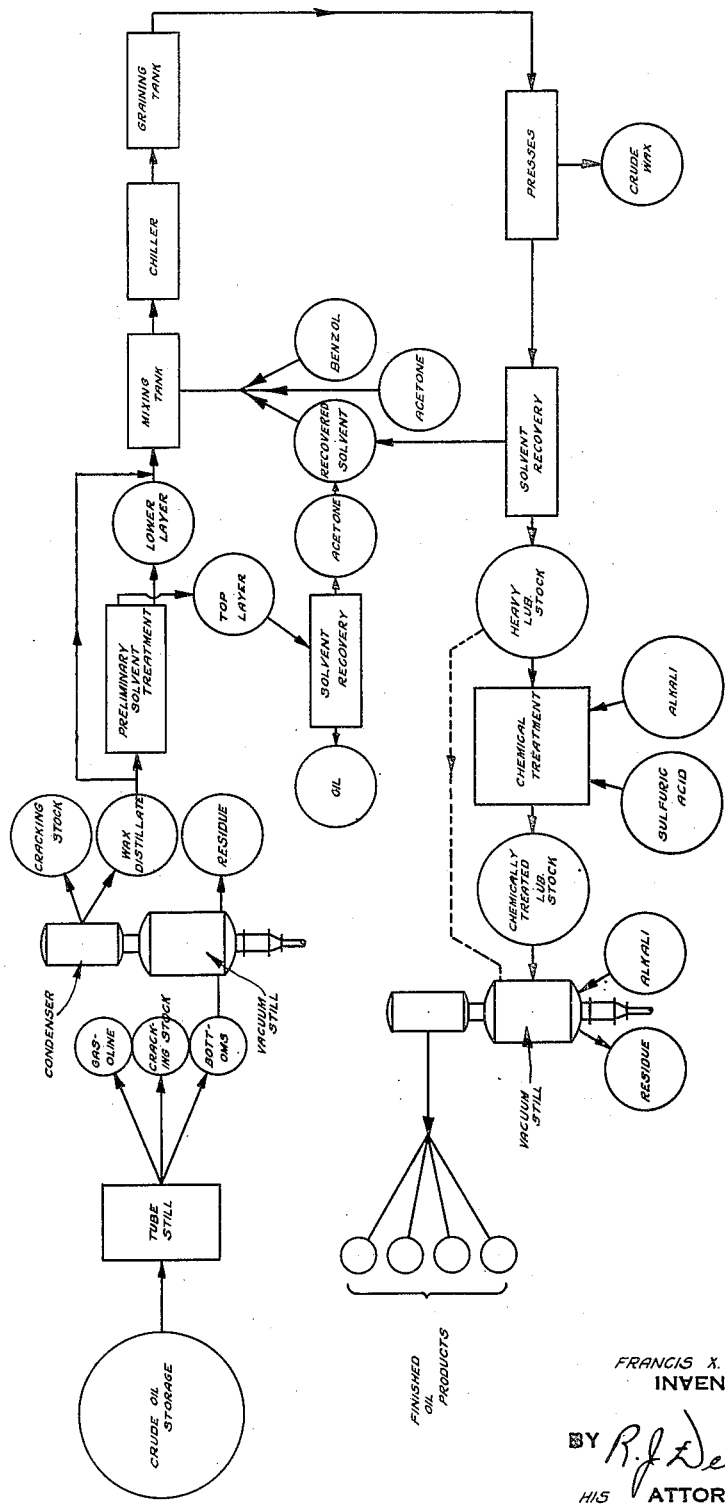

Patented July 25, 1933

1,920,125

UNITED STATES PATENT OFFICE

FRANCIS X. GOVERS, OF VINCENNES, INDIANA, ASSIGNOR TO INDIAN REFINING COMPANY, OF LAWRENCEVILLE, ILLINOIS, A CORPORATION OF MAINE

PROCESS FOR THE RECOVERY AND PURIFICATION OF LUBRICATING OILS FROM MINERAL OILS

Application filed April 2, 1931, Serial No. 527,104, and in Canada September 9, 1929.

This invention relates to the improvement in methods of obtaining from mineral oils, fractions suitable for the manufacture of lubricants and to so refine such fractions as to improve the lubricating characteristics of the resulting oils, and more particularly to such methods as applied to mineral oils containing a substantial amount of paraffin wax.

This application is a division and continuation, in part, of my application, Serial No. 313,346, filed October 18, 1928.

The method not only produces lubricating oils having markedly superior lubricating values, but in addition thereto gives greatly increased yields of lubricants and paraffin wax from a given amount of crude oil.

Lubricating oils must not only possess the property of forming coherent and adherent films but they must, in addition, possess "body" enough for the required duty. They should flow readily at low temperatures (say 0° F.) and should retain at high temperatures (say 400° F.) enough "body" and "oiliness" (by "oiliness" is meant the property of being adsorbed by or wetting the surface of a metal) for the duty required. The components of lubricating oils should retain, at all times, under conditions of use their mutual solubility, and the oils should not become cloudy, opaque or show signs of separation at low temperatures. They should not corrode or tend to dissolve the bearing metals under conditions of use, and should contain no free carbon.

In the cases of lubricants for internal combustion engines they should retain their property of "oiliness" at high temperatures and under conditions of crank case dilution and should not form an emulsion with water.

As ordinarily manufactured, lubricants made from naphthene base oils have the property of retaining at low temperatures the mutual solubility of component hydrocarbons and the formation of coherent films but are lacking in that they do not have the necessary degree of "oiliness" under conditions of crank case dilution or at elevated temperatures.

As ordinarily manufactured, lubricants made from paraffin base crudes retain to a greater degree than the naphthene base lubricants their "oiliness" at high temperatures and under crank case dilution, but at low temperatures, the components of the paraffin base lubricants as heretofore made tend to lose their mutual solubility, and these oils show signs of cloudiness, due to the separation of solid hydrocarbons, and lose their "oiliness".

As most of the loss of mutual solubility at low temperatures in lubricants made from wax-containing crude oils is due to the separation of paraffin wax, these lubricants are put through a so-called "dewaxing" process, which consists of cooling or chilling a fraction containing lubricants down to a temperature where the wax separates out and filtering out the separated wax. Due to difficulties in manufacture this "dewaxing" is seldom if ever complete.

The usual explanation of the lack of complete "dewaxing" is that wax exists in two states, an amorphous and a crystalline state, and that the wax in the amorphous state not only does not separate out but prevents the otherwise crystallizable wax from separating.

It is common procedure, almost universal, in the manufacture of lubricants from paraffin base crude oils, to distill from the crude, fractions containing the desired lubricants and then to submit these fractions to a "cracking" operation, whereby, it is claimed, the amorphous wax is converted into the crystallizable body and then to submit the "cracked" fractions to a "dewaxing" process.

While this "cracking" operation results in a product that contains less wax and is, therefore, easier to dewax, the "dewaxing" is never complete and the tendency to separation at lowering temperatures remains. This "cracking" operation not only breaks down the so-called amorphous wax but part of the crystallizable wax as well, and converts much of the valuable lubricating fraction into compounds of lower boiling point and of lessened value.

Lubricants made from oils so "cracked" tend to lose the peculiar and highly desirable quality of "oiliness", this tendency becoming greater as the degree of "cracking" increases.

In an attempt to retain to a high degree this quality, it has been proposed to limit the "cracking" effect, as far as possible, by the use of distillation methods calling for lower temperatures under diminished pressures.

The methods heretofore described calling for the use of diminished pressures and a lowered temperature in distillation do not entirely prevent the undesirable "cracking" effect, and in the case of crude oils containing considerable quantities of paraffin wax the difficulties of "dewaxing" are increased and it has, up to the development of the new method herein described, been impossible to produce a lubricating oil of the desired "oiliness" in which mutual solubility of its component parts at low temperatures is preserved.

Dissociation or decomposition of hydrocarbons under heat is promoted by diminished pressure.

Temperature indications are mean temperature indications only and do not denote that portions of a mass are not heated higher than such mean indicated temperature.

I have discovered in the manufacture of lubricants that, in order to preserve fully their inherent "oiliness" and mutual solubility, under conditions of use, it is not only necessary to remove, in refining, such portions or fractions as tend to separate under conditions of temperature or use, but it is important to so control the process that no portion of the lubricant has, in the course of manufacture, been heated above a definite and fixed point.

I have discovered that, by the use of controlled indirect heating, it is possible to distill and redistill the fractions of mineral oil suitable for lubrication under diminished pressure without decomposition or dissociation, and at the same time preserve the natural "oiliness" inherent in lubricants made from paraffin base oils.

I have discovered that, by the use of a suitable solvent treatment, it is possible to separate out from the main body of the lubricant fraction of the oil such portions as will tend to separate out later under conditions of use and/or lowering temperature.

I have discovered that, by the use of a mixture of solvents of differing solvent properties, it is possible to get a better separation from the lubricating oils of the desirable portions from those which are undesirable, from a lubricant standpoint.

I have discovered that, by the use of suitable solvents and the selection of particular fractions obtained by distillation under diminished pressure with controlled indirect heating, it is possible to obtain from any given crude oil, lubricating oils characterized by a high degree of "oiliness", and maintenance of the mutual solubility of the components even at low temperatures.

By suitable solvent I mean a liquid which at temperatures of approximately 100° F. has substantially complete solvent action on a mineral oil wax distillate substantially free from constituents having a boiling point equal to or below that of gas oil and at temperatures of −5° and below has substantially complete solvent action on the liquid hydrocarbons therein but substantially no solvent action on the solid hydrocarbons therein and of such a nature that upon cooling a solution of such mineral oil wax distillate in the solvent liquid to 0° F. and removing the solid hydrocarbons so precipitated and the solvent liquid the resulting oil has a cold test of substantially 0° F.

I have found that those constituents of lubricant containing oils which have high specific gravities and relatively steep viscosity-temperature relationships can be separated from those constituents which have low specific gravities and a relatively flat viscosity-temperature relationship by extracting the lubricating oil with a selective solvent such as acetone, for example.

In the past the oil which probably was best suited to summer conditions was a lubricating oil made from Pennsylvania type crude oils but due to the fact that the Pennsylvania type oils are wax-bearing oils it has been impossible, prior to my invention, to produce oils from this source of sufficiently low cold test for winter use. On the other hand, the lubricating oils made from the so-called naphthene base crudes, which were not of the wax-bearing type, or, if containing wax at all, are easily dewaxed, have the characteristic of having very high viscosity at low temperatures, as compared to oil made from Pennsylvania type crudes of like viscosity at 210° F.

I am able to produce lubricating oils having all the characteristics so much desired by the automobile industry and automotive engineer, viz., oils having a low pour test and combined with such low pour test, a low viscosity temperature relation at 0° F. as compared to an oil produced from the napthene base crudes, having the same viscosity at 210° F. I am able to produce lubricating oils from mixed base crudes, or crudes of the type from Mid-Continent, Illinois and Indiana fields, having characteristics of relatively low specific gravity with relatively narrow increase in viscosity from 130° F. to 210° F. as compared with lubricating oils of the prior art. Prior to my discovery, lubricating oils have existed in the trade having relatively high specific gravity coupled with a low pour test and also oils of relatively low specific gravity coupled with relatively high pour test but no low pour test oils have appeared on the market or have been produced commercially having a relatively low specific gravity as compared with viscosity at 210° F. The oils produced by the new method have the property of the right degree of oiliness and viscosity at a temperature at which they are used while flowing readily and with not too great a resistance to flow at temperatures of 0° F. and below.

In a simple embodiment, my invention contemplates distilling, under conditions of diminished pressure coupled with controlled indirect heating, from crude oils the lubricating oil fractions under a low absolute pressure, advantageously about 5 mm., removing from such fraction, by means of a selected and selective solvent treatment at a desired temperature, and subsequent cooling, such portions as tend to separate out under use of lowering temperature or tend to lessen the desired "oiliness"; removing from the lubricating portion the solvent used; treating the portion remaining after removal of the solvent to remove sulphur and sulphur-bearing bodies; and finally redistilling, under diminished pressure and controlled indirect heat, into fractions differing, in accordance with the requirements of the trade, as to body and gravity.

The advantages of distilling mineral oils under diminished pressure or in a so-called vacuum have been recognized for many years, and the extra advantage of a very high degree of vacuum due to the extreme lowering of the boiling point of the desired fraction has been recognized, but the adaptation of very high vacuum operations to commercial products has been held back because of the peculiar characteristics of the material under treatment. Mineral oils having a relatively high viscosity are rather sluggish in heat transfer, and under methods hitherto proposed much of the good effects of high vacuum are destroyed or rendered in part ineffective by reason of the method of heating. Direct heating of the distilling vessel by means of products of combustion does not wholly achieve the desired purpose, because, due to the low rate of heat transfer from gas to oil, high temperature differences are employed and parts of the mass are heated beyond the desired temperature, this tendency to overheating being accentuated by the viscosity of the oil and its low heat conductivity. These difficulties can be overcome in part by the use of indirect heating, and while this is effective so far as permitting the control of the heating medium to a greater extent than in the case of direct fire apparatus and in the prevention of overheating, the capacity of the apparatus is limited by reason of the sluggishness of the oil to absorb and transmit heat in the ordinary type of still. I have discovered, however, that if the oil to be distilled is moved at high velocity over a heated surface maintained at or about the requisite degree of temperature, the temperature differences between the body of the oil under treatment and the heating medium, which may be a suitable vapor or liquid, can be kept to a minimum, and that a high rate of heat transfer can be maintained at low temperature differences. This results in a minimum of change in the oil under treatment and the retention of all the desired qualities, both in the liquid and solid hydrocarbons.

As means for heating the surfaces over which the oil is rapidly circulated, I use instead of direct heating by flame or products of combustion, a suitable heated fluid advantageously circulated to and from a source of heat supply, such as the condensible vapor of a high boiling compound such as diphenyl, which vapor is of stable composition at the temperature used, or a molten metal such as lead or a fusible alloy (as described in my Patent No. 1,586,987, patented June 1, 1926).

The use of mercury vapor under maintained vacuum for this purpose has been proposed, but is objectionable. The use of superheated steam is not feasible, nor can high boiling hydrocarbon oils be used because they decompose on continued heating.

These and other similar methods of heating have become known in the art as "indirect heating" as distinguished from direct heating by flame or products of combustion.

It has been proposed to fractionally separate liquid hydrocarbons by means of selective solvents and it has been proposed to use solvents as diluents in the manipulation of lubricating bearing fractions prior to and during the removal of wax. All the solvents hitherto proposed have not had sufficient selective solvent action as between the solid hydrocarbons and the liquid hydrocarbons under treatment. Acetone, both in a pure and diluted state, has been proposed as a solvent for the selective separation of differing liquid portions of hydrocarbons. It has also been proposed to use various alcohols for such purpose. It has been proposed to use benzol and toluol as diluents. The use of acetone by itself results in the separation of the liquid hydrocarbons into various differing fractions and the use of benzol by itself results in lubricating fractions which, after removal of the benzol, show great increase in temperature at which the finished lubricating oil shows cloudiness or separation of solid hydrocarbons.

I have discovered, however, that by combining the two solvents in proper proportions, there is no separation of the liquid hydrocarbons into several varying fractions, and that upon chilling, the solid hydrocarbons are entirely separated in such a state as to permit of easy separation either by centrifugal force or by means of filtration, and that after removal of the solvents, the lubricating oils retain their "oiliness" at all temperatures and remain homogeneous at low temperatures.

I have also found that the property of "oiliness" can be advantageously increased by the removal of undesired fractions of liquid hydrocarbons by means of a selective solvent.

I will now describe in detail a form of apparatus suitable for carrying out my process.

Referring to the drawings:

Fig. 2 is a sectional detail of the oil heater element;

Fig. 3 is a sectional elevation of a boiler for delivering hot vapor to the oil heater; and Fig. 4 is a flow sheet of the entire process.

Figure 1:
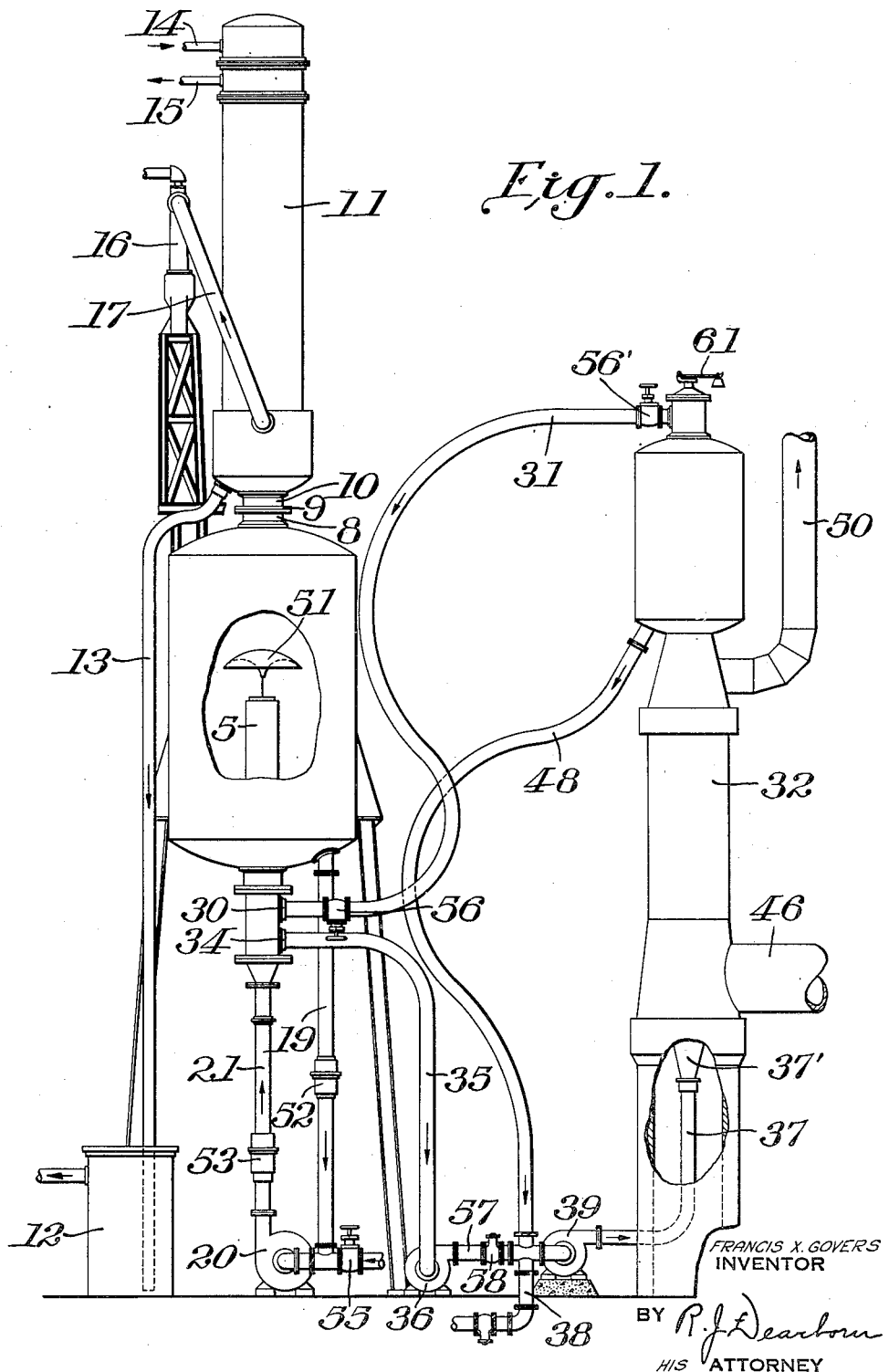
Fig. 1 is an elevation of the apparatus.

Referring to Figs. 1, 2 and 3 of the drawings, the apparatus consists of an evaporator 6, having an outlet 8 connected by flange 9 to the inlet 10 to the condenser 11. Condenser 11 is connected to receiver 12 by means of a barometric discharge pipe 13. The condenser 11 is further provided with a water inlet 14 and water outlet 15, and is connected to a jet ejector 16 by means of pipe 17. The heating element 5 (shown in detail in Fig. 2) and the evaporator 6 are connected by a circulating system comprising down-take pipe 19, circulating pump 20 and up-take pipe 21. The heating element 5 (see Fig. 2) comprises an outer shell 22, provided with headers 23 and 24 into which are expanded tubes 25. The upper header 23 is secured to the shell 22 which has, at its lower end, an enlarged portion 22′ within which is a packing chamber. Extending upwardly from the header 24 is a cylindrical shell 24′, between which and 22′ packing material, advantageously asbestos fiber, is located, which is held in place by a gland member 60. This arrangement allows for expansion of the tubes without undue strain. At its upper portion the shell 22 is surrounded by a jacket 26, the intermediate space being advantageously filled with heat insulating material 27. This construction need not be further specifically described, as it will be apparent from the drawings. The heating element is advantageously heated by hot vapor entering through the neck 30 from the pipe 31, provided with valve 56, which is connected to the boiler 32. The heating vapor passes upwardly around through the space between shells 22 and the shell 33 which surrounds the tubes 25, through which the oil passes, and the vapor then flows downwardly in contact with these tubes. The vapor is thereby condensed and collects in the bottom of the chamber above the header 24, and flows outwardly through the neck 34 which is connected to the pipe 35 leading to a pump 36 by which it is returned through pipe 57 having check valve 58 to pump 39 and thence through pipe 37 leading into a chamber 37′ at the bottom of the boiler 32.

The boiler 32 is supplied with a high boiling point liquid, such as diphenyl, delivered by supply pump (not shown) through pipe 38 leading to a circulating pump 39 from which it is delivered by pipe 37 into chamber 37′ and thence into a series of tubes 41 mounted between headers 42, 43. The bank of tubes 41 is mounted within a brickwork stack 44 which may be heated in any suitable manner, as by hot gases delivered into the lower portion of the heating chamber 45 through a connection 46 (shown in dotted line) leading to any suitable heat supply. The liquid passing through the pipes is delivered against a spreader 62 into a vapor chamber 47 having a safety valve 61, from which chamber the vapors are delivered through pipe 31 and pressure regulating valves 56, 56′ to the vapor inlet 30 of the heating element 5.

The unvaporized liquid passes from the chamber 47 through the pipe 48 to the pump 39 and is circulated through the heated tubes. These pipes 48, 31 and 35 are provided with suitable bends to provide for expansion and contraction.

From the heating chamber 45 the hot gases may be delivered into a stack 50.

As a high boiling liquid, I may advantageously use melted diphenyl, which melts at about 158° F. and boils at about 485° F., and at a pressure of approximately 110 pounds has a temperature of about 750° F.

By means of the system shown, the tubes in the heating element 5 are externally heated by the hot diphenyl vapor and can therefore be readily maintained at any desired temperature.

The oil is continuously forced upwardly by the pump 20 through the heated tubes 25 and the mixed liquids and vapors are discharged against the spreader 51 in order to permit the separation of the oil vapors from the liquid oil which flows downwardly through the pipe 19 to the pump 20.

The temperature of the vapor delivered through pipe 31 is controlled by varying the pressure under which the high-boiling point liquid is vaporized. The temperature of the tubes through which the oil is circulated can thus be accurately controlled. The rate at which the oil is heated in its passage through the heated tubes may be controlled by varying the speed of the circulating pump 20.

There can thus readily be maintained any desired temperature difference between the heated surfaces and the flowing oil in contact therewith, thereby enabling the gradual, uniform heating of the body of oil to the desired distillation temperature without any danger of overheating portions thereof, and cuts may be taken off within as narrow ranges of temperature as considerations may dictate.

All pipes conveying hot liquids or vapors are heavily insulated to avoid loss of heat, and all pipes containing diphenyl are provided with means for liquefaction or for maintaining the diphenyl in liquid state. The pipes 19 and 21 are provided with slip joints 52 and 53 to provide for expansion and contraction.

The system is provided at all necessary points with heat and pressure indicating devices.

A specific example of the operation of the process and apparatus is as follows:

1000 bbls. (42 gals. each) of Illinois crude oil are topped in a pipe still in which is distilled off at a temperature not in excess of 675° F. about 28% (of the body of the oil) in the form of a gasoline cut, and 17% in the form of a cut suitable for cracking. The remaining 550 bbls. are transferred to a vacuum still as above described.

In this still, the oil to be distilled is introduced into the pipe 55 and circulated in the manner above described through the externally heated tubes 25. The partially vaporized circulating oil from the tubes 25 is distributed by the spreader 51 in the form of a curtain, the unvaporized portion going down to the body of the evaporator 6 to be circulated through the circulating system and the vapor portion going off through the outlet neck to the condenser 11 where it is condensed and flows through the barometric discharge pipe 13 to the receiver 12. The surface condenser is cooled by means of water; during the evaporation and condensation, a pressure less than that of one atmosphere absolute (advantageously a pressure of 5 mm. or less) is maintained on the evaporation system by means of the ejector 16.

There are first distilled off 170 bbls. under this low pressure, from an initial temperature of approximately 220° F. to a final temperature of approximately 400° F. This material can be separated in distillation, into fractions for various uses, or may be run off in one fraction for cracking stock.

There is then distilled off under low pressure (advantageously 5 mm. absolute) at an initial temperature of approximately 400° F. and a final temperature of approximately 620° F., 250 bbls., which fraction constitutes a wax distillate. My invention is not limited to the use of a cut within this range, as a cut within a wider or a cut or cuts within narrower ranges, may be used as considerations may require.

The residue of 130 bbls. remaining in the vacuum still may be burned or worked up in a special form of vacuum evaporator for still heavier oils.

During the period of distillation, care is taken that the temperature of the oil does not exceed 675° F. and that the heating medium used for the indirect heating does not exceed 730° F. It may be advantageous in some instances to resort to higher oil temperatures not in excess of 700° F., where a greater yield of distillate is desired and the small amount of cracking which may thus occur does not render the resulting product unsuitable for commercial use.

To this wax distillate fraction may be added its own volume (or more) of acetone, and thoroughly mixed at a temperature of 100° F. It is then cooled to 80° F. or lower and allowed to stand. There is a sharp separation into two layers, and the top layer containing most of the solvent and about 10% of the wax distillate, is drawn off. From this portion, the acetone is evaporated and the residue treated according to the use to which it is to be put.

The amount of acetone used depends upon the desired fractional separation of the liquid hydrocarbons, and may be more or less than the amount above stated. This fractional separation using acetone may be effected in one or more operations.

The bottom layer, consisting of about 90% of the original wax distillate and 15% of the acetone used, is mixed with 7000 gals. of benzol and 5,425 gals. of acetone heated to 90° F. and stirred thoroughly.

If it is not desired to make fractional separation of the liquid portions of the wax distillate hydrocarbons, the step of extracting the wax distillate may be omitted, and the wax distillate mixed directly with one and one-half times its volume of a mixture of equal parts of acetone and benzol, and heated to about 90° F.

The mixture of wax distillate and mixed solvents is then cooled, in a flowing stream and under mild agitation, to a low temperature, such as −5° F. or less, and run into grainers where it is stirred until there is a complete separation between the soluble and insoluble constituents.

This mixture of lubricating oil stock and solvents containing finely divided separated matter is then run through filter presses in which the suspended matter is separated out. The filter cake is worked up for the recovery and purification of the paraffin wax, and the filtrate is run to evaporators where the solvents are evaporated off. The remainder of the filtrate may then be treated with 66° sulphuric acid, and acid and sludge centrifuged off, treated at 250° F. with an alkaline solution and the alkaline solution and separated matter certifuged off.

While acid treatment of the oil following removal of the wax has thus been described, it is frequently advantageous to chemically treat the wax distillate prior to the steps of fractionally separating by extracting with a solvent and of removing the wax in the presence of a selective solvent.

The thus treated distillate or lubricating oil stock, about 8500 gals., is transferred to a vacuum still of the type above described, where it is separated by distillation under low pressure, advantageously of the order of 5 mm., into the required fractions. This distillation is preferably conducted in the presence of alkali, as for example caustic soda, either in solution or as a finely divided solid, in the approximate proportion of about 1 lb. of caustic soda to about 100 gals. of oil. For some grades of lubricating oils, the acid and alkali treatment may be omitted. During such distillation the temperature of the heating medium is not allowed to exceed 730° F.

An example of fractional distillation under an absolute pressure of about 5 mm. is shown in the following table:

| Gals. distilled | Initial B. P. | Final B. P. | Viscosity at 100° F. |
|---|---|---|---|
| 1360 | 380° F. | 410° F. | 200 Saybolt |
| 1360 | 410 | 440 | 300 |
| 1630 | 440 | 480 | 450 |
| 2210 | 480 | 540 | 850 |
| 1360 | 540 | 600 | 1100 |

*Residue*

The residue can be accumulated until there is enough for distillation and then be redistilled to a heavier oil than the 1100 viscosity in the above example, giving at an initial boiling point temperature of 600° F. and a final boiling point of 640° F. a lubricant of approximately 1700 Salbolt viscosity at 100° F.

The fractions as given in the above example are distinguished and differentiated from the lubricating oils ordinarily found in commerce by the comparative absence of red (when viewed by transmitted light in a Lovibond Tintometer), by their retention of mutual solubility under low temperature conditions, by their "oiliness" under high temperature conditions, by their absence of "bloom", in their relation of gravity to absolute viscosity, by their relatively low coefficient of friction under heavy loads, by their freedom from sulphur compounds and by their absence of corrosive action.

Lubricating oils as found in commerce may have grouped together in a given oil a few of the desirable properties above enumerated but up to the discovery of the above described method for the recovery and refining of lubricating fractions of mineral oils, no lubricating oils have been known to possess, in any given oil, all of the above enumerated desirable qualities and properties.

Examples of the finished lubricating oils produced by this method are shown in the accompanying table:

| | 1 | 2 | 3 | 4 | 5 |
|---|---|---|---|---|---|
| Vapor tem. at 10 mm. abs. | 438-468 | 472-498 | 502-538 | 540-566 | 566-592 |
| Color ¼″ cell | 4 | 10 | 14 | 20 | 27 |
| Gravity °A.P.I. | 24.2 | 23.8 | 23.1 | 22.4 | 21.8 |
| Vis. at 100 | 237 | 455 | 676 | 1026 | 1652 |
| Flash | 420 | 455 | 465 | 480 | 515 |
| Fire | 475 | 525 | 545 | 575 | 605 |
| Pour test F° | −5 | Zero | Zero | Zero | Zero |
| Cold test F° | −6 | −5 | −5 | −5 | −5 |
| Cloud at zero degrees F | No | No | No | No | No |

While in the above examples the mixture of the solvent and wax distillate was cooled to a temperature of −5° F. and the solid hydrocarbons removed by filtration to produce lubricating oil of 0° F. or −5° F. pour point, it is to be understood that lower chilling and filtering temperatures may equally well be employed for the production of oil having correspondingly lower pour points, as for example, a pour point of −20° F. or lower if desired.

The lubricating oil may be subjected to extraction after removal of the wax constituents to separate the constituents having a high specific gravity and steep viscosity-temperature relation from those having a low specific gravity and relatively flat viscosity-temperature relation as outlined in the following example. A lubricating oil produced from Mid-Continent crude and from which the wax was removed according to the above method, had the following characteristics:

Gravity A. P. I. _____ 22.1
Vis. @ 100 _____ 979
Vis. @ 130 _____ 369
Vis. @ 210 _____ 71½
Flash °F. _____ 465
Fire °F. _____ 560
Pour test °F. _____ −10
Conradson carbon % _____ .29

Vacuum redistillation of a sample of this oil gave fractions with the following characteristics:

| Gravity A.P.I. | 22.4 | 22.3 | 22.4 | 22.4 | 22.4 | 22.1 |
|---|---|---|---|---|---|---|
| Vis. @ 100 | 598 | 787 | 892 | 978 | 1198 | 1514 |
| Vis. @ 130 | 233 | 302 | 327 | 370 | 416 | 560 |
| Vis. @ 210 | 59½ | 66½ | 67 | 71 | 76 | 88 |
| Pour test °F | −8 | −10 | −10 | −10 | −10 | −6 |
| Viscosity index | 48 | 50 | 32 | 41 | 34 | 47 |

The above lubricating oil was treated or extracted at 60° F. with acetone until the undissolved constituents comprised 30% of the whole, and after removal of the acetone therefrom this undissolved portion had the following characteristics:

| | |
|---|---|
| Gravity A. P. I | 28.1 |
| Vis. @ 100 | 393 |
| Vis. @ 130 | 180 |
| Vis. @ 210 | 58.5 |
| Flash °F | 440 |
| Fire °F | 490 |
| Pour test °F | −5 |
| Conradson carbon % | .012 |

Vacuum distillation of the above treated oil gave fractions with the following characteristics:

| | | | | |
|---|---|---|---|---|
| Gravity A.P.I | 30.1 | 29.0 | 28.8 | 27.5 |
| Vis. @ 100 | 235 | 382 | 578 | 950 |
| Vis. @ 130 | 119 | 176 | 256 | 396 |
| Vis. @ 210 | 48½ | 56 | 65 | 83 |
| Flash °F | 455 | 460 | 470 | 485 |
| Fire °F | 510 | 540 | 560 | 570 |
| Pour test °F | −5 | −5 | −5 | −5 |
| Conradson carbon % | .012 | .010 | .012 | .012 |
| Viscosity index | 97 | 91 | 86 | 89 |

The viscosity index of each of the foregoing fractions has been calculated by the method of E. W. Dean and G. H. B. Davis, described in an article entitled, "Viscosity variations of oils with temperature", published on pages 618–619 of Chemical and Metallurgical Engineering, Volume 36, No. 10, October, 1929.

It will be obvious from the foregoing that many modifications may be made in the details of the process without departing from the spirit and scope of my invention.

I claim:

1. The process of manufacturing distillate lubricating oil of low pour test and high viscosity index which comprises producing a distillate cylinder stock substantially free from constituents having a boiling point equal to or below that of gas oil, treating such fraction with acetone to dissolve constituents of low viscosity index, separating the undissolved constituents of high viscosity index therefrom, adding to the separated constituents acetone and benzol, chilling the mixture to a temperature of 0° F. or below, removing the separated solid hydrocarbons, and evaporating and recovering the solvents from the remaining liquid.

2. The process of manufacturing distillate lubricating oil of low pour test and high viscosity index which comprises producing a highly viscous wax distillate fraction substantially free from constituents having a boiling point equal to or below that of gas oil, treating such fraction with acetone to dissolve constituents of low viscosity index, separating the undissolved constituents of high viscosity index therefrom, adding to the separated constituents a solvent liquid which at temperatures of approximately 100° F. has substantially complete solvent action on a mineral oil wax distillate substantially free from constituents having a boiling point equal to or below that of gas oil, and at temperatures of minus 5° F. and below has substantially complete solvent action on the liquid hydrocarbons therein but substantially no solvent action on the solid hydrocarbons therein, and of such a nature that upon cooling a solution of such separated mineral oil wax distillate in the solvent liquid to 0° F. and removing the solid hydrocarbons so precipitated and the solvent liquid the resulting oil has a cold test of substantially 0° F., chilling the mixture to a temperature at which substantially all of the solid hydrocarbons separate, removing the separated solid hydrocarbons, and evaporating and recovering the solvent from the liquid fraction.

3. The process of manufacturing distillate lubricating oil of low pour test and high viscosity index which comprises producing a highly viscous wax distillate fraction substantially free from constituents having a boiling point equal to or below that of gas oil, treating such fraction with a solvent adapted to dissolve the constituents of low viscosity index, separating the undissolved constituents of high viscosity index therefrom, adding to the separated constituents acetone and benzol, chilling the mixture to a temperature of 0° F. or below, removing the separated solid hydrocarbons, and evaporating and recovering the solvents from the liquid fraction.

4. The process of manufacturing distillate lubricating oil of low pour test which comprises producing a highly viscous wax distillate fraction substantially free from constituents having a boiling point equal to or below that of gas oil, adding to this fraction a solvent liquid which at temperatures of approximately 100° F. has substantially complete solvent action on a mineral oil wax distillate substantially free from constituents having a boiling point equal to or below that of gas oil, and at temperatures of minus 5° F. and below has substantially complete solvent action on the liquid hydrocarbons therein but substantially no solvent action on the solid hydrocarbons therein, and of such a nature that upon cooling a solution of such mineral oil wax distillate in the solvent liquid to 0° F., and removing the solid hydrocarbons so precipitated and the solvent liquid the resulting oil has a cold test of substantially 0° F., then precipitating solid hydrocarbons by cooling the mixture to a temperature below 0° F. and removing the precipitated hydrocarbons.

5. Process of manufacturing lubricating oils of low pour test and high viscosity index from highly viscous distillate wax-bearing mineral oils substantially free from constituents having a boiling point equal to or below that of gas oil which comprises treating such fraction with a solvent adapted to dissolve constituents of low viscosity index, separating the undissolved constituents of high viscosity index therefrom, adding to the separated constituents a solvent liquid which at temperatures of approximately 100° F. has substantially complete solvent action on a mineral oil wax distillate substantially free from constituents having a boiling point equal to or below that of gas oil, and at temperatures of minus 5° F. and below has substantially complete solvent action on the liquid hydrocarbons therein but substantially no solvent action on the solid hydrocarbons therein, and of such a nature that upon cooling a solution of such mineral oil wax distillate in the solvent liquid to 0° F., and removing the solid hydrocarbons so precipitated and the solvent liquid the resulting oil has a cold test of substantially 0° F., chilling the mixture to a temperature of 0° F. or below, removing the separated solid hydrocarbons, and evaporating and recovering the solvents from the liquid fraction.

6. Process of making lubricating oil of high viscosity index and low pour test which comprises mixing a wax-bearing distillate lubricant-containing fraction of a crude oil substantially free from constituents having a boiling point equal to or below that of gas oil with acetone, allowing the mixture to stand and separating the resulting two liquid layers, adding acetone and benzol to the lower layer in quantities sufficient with the acetone already present to provide in the mixture about equal parts of acetone and benzol in quantity amounting to about one and one-half times that of the oil in the mixture, cooling the mixture whereby the wax content is substantially completely precipitated, separating the precipitated wax and recovering the dewaxed oil from the separated solution thereof.

FRANCIS X. GOVERS.